US006219119B1

(12) United States Patent
Nakai

(10) Patent No.: US 6,219,119 B1
(45) Date of Patent: Apr. 17, 2001

(54) REFLECTOR AND LIQUID-CRYSTAL DISPLAY DEVICE

(75) Inventor: Yutaka Nakai, Kanagawa-ken (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 0 days.

(21) Appl. No.: 09/270,674

(22) Filed: Mar. 16, 1999

(30) Foreign Application Priority Data

Mar. 16, 1998 (JP) .................................................. 10-065207
Mar. 4, 1999 (JP) .................................................. 11-056457

(51) Int. Cl.[7] .......................... G02F 1/1335; G02F 1/1343
(52) U.S. Cl. ............................... 349/113; 349/95; 349/143
(58) Field of Search .............................. 349/95, 113, 143, 349/586, 587

(56) References Cited

U.S. PATENT DOCUMENTS 5,477,351 * 12/1995 Takahara et al. ....................... 359/40
5,990,992 * 11/1999 Hamanaka et al. .................... 349/95

FOREIGN PATENT DOCUMENTS 6-230399    8/1994   (JP) .

* cited by examiner

Primary Examiner—William L. Sikes
Assistant Examiner—Quynh-Nhu H. Vu
(74) Attorney, Agent, or Firm—Oblon, Spivak, McClelland, Maier & Neustadt, P.C.

(57) ABSTRACT

A reflector including a reflecting surface having hills and valleys, and light-condensing regions disposed above the hills. The light-condensing regions have a larger refractive index than other regions around it. The reflecting surface may include a substrate of, for example, resin or the like having hills and valleys thereon, and a layer of a high-reflectance metal of, for example, aluminium, silver or the like disposed on the substrate. The light-condensing regions are selectively disposed on each hill of the reflecting surface so that the incident rays entering the greatly inclined region between the hill and an adjacent valley on the reflecting surface are condensed in the hill.

24 Claims, 13 Drawing Sheets

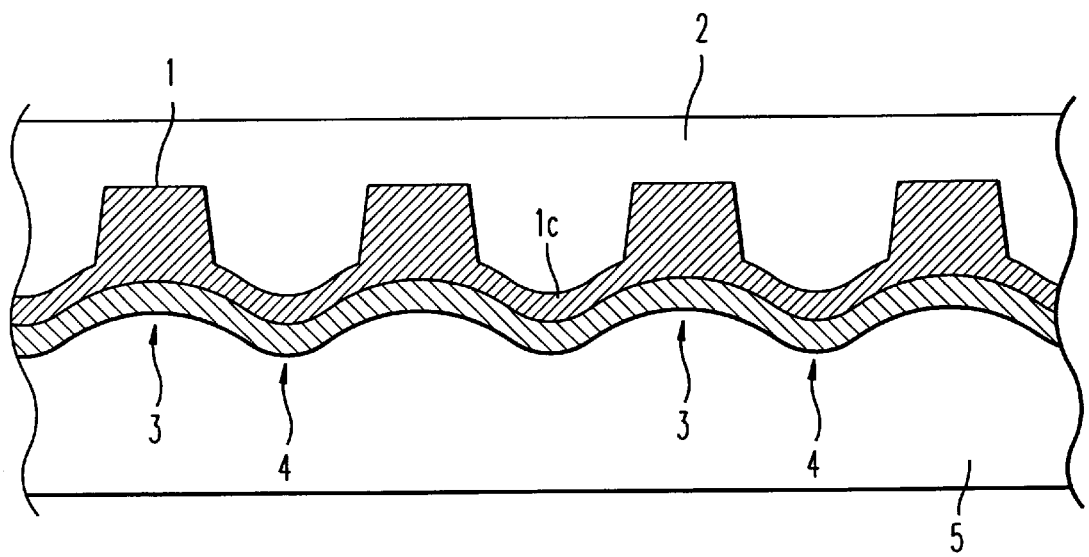
FIG. 9
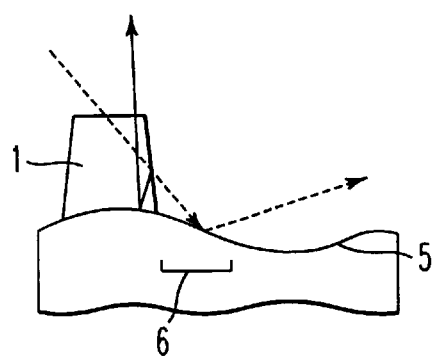 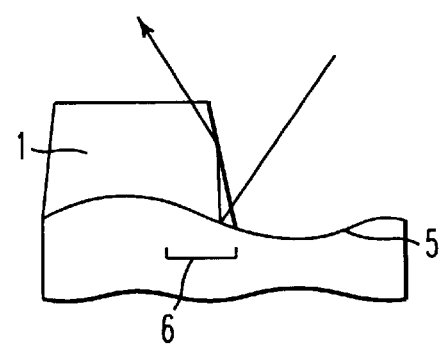
FIG. 10a  FIG. 10b

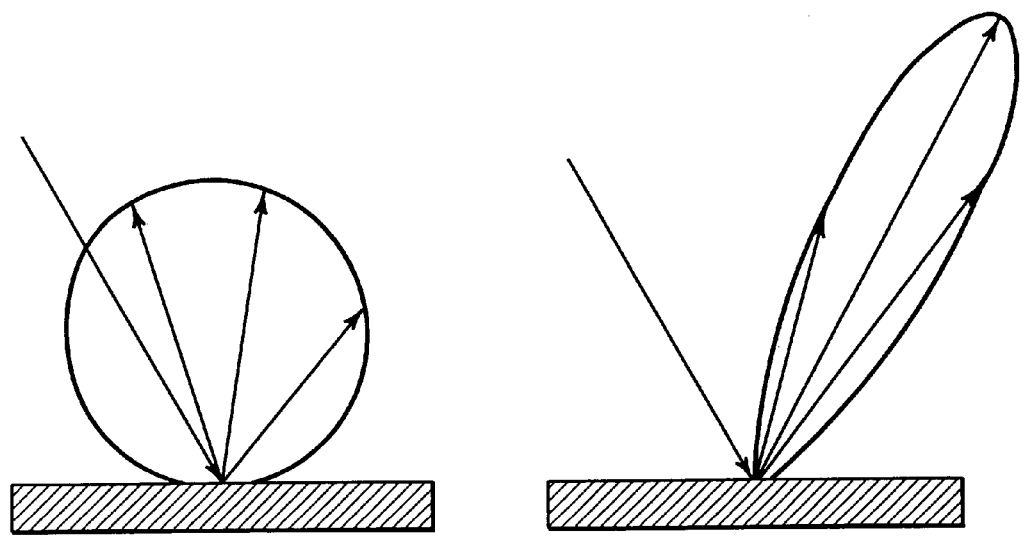
*FIG. 19a*  *FIG. 19b*
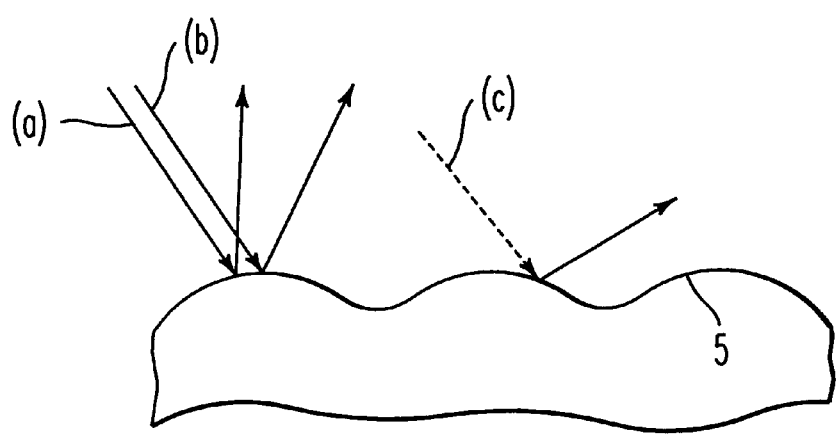
*FIG. 20*

REFLECTOR AND LIQUID-CRYSTAL DISPLAY DEVICE

BACKGROUND OF THE INVENTION

1. Field of the Invention

The present invention relates to a reflector, and in particular to that for reflection-type liquid-crystal display devices. It also relates to a liquid-crystal display device, and in particular to a reflection-type liquid-crystal display device.

2. Discussion of the Background

The recent tendency in the art is toward new display devices which are substituted for a conventional CRT, and a liquid-crystal display device (hereinafter referred to as an LCD) is one of them. LCDs are widely used in various fields, for example, as those for Office Automated (OA) apparatus, such as personal computers, word processors, work stations, etc.; those for electronic calculators, electronic books, electronic notebooks, personal digital assistant (PDA) apparatus, etc.; and those for portable TVs, portable telephones, portable facsimiles, etc.

In particular, display devices for portable apparatus are generally required to consume a small amount of power, because they are driven by batteries or the like. In addition, LCDs can be small-sized, thinned, and driven by a small amount of power, and are becoming much more popular.

Liquid crystals do not emit light by themselves. That is, liquid crystals are non-emitting display elements. Conventional LCDs are grouped into transmission-type ones and reflection-type ones.

The transmission-type LCD includes a flat lighting element, called a "back-light", at a back surface of the liquid-crystal panel. This type has been the mainstream in the art. However, the back-light consumes a relatively large amount of power, and therefore interferes with the advantage of low-power operability intrinsic to LCDs.

On the other hand, the reflection-type LCD includes a reflector for reflecting light at a back surface of the liquid-crystal panel, in which ambient light is reflected on the reflector to display images. This does not require a back-light, and therefore reduces the amount of required power. However, in conventional reflection-type LCDs, the liquid-crystal member has a low transmittance of a few percent to about ten percent. Therefore, the ambient light reflection cannot produce satisfactory brightness. For example, the devices cannot display bright paper white, and cannot display vivid color images. For these reasons, reflection-type LCDs have not been put into practical use in various fields, except for specific applications, such as wristwatches, electronic calculators, etc.

However, with the recent development of portable apparatus, there is a significant increase in demand for power-saving display devices. Therefore, the necessity of reflection-type LCDs has been taken into consideration. In particular, because reflection-type LCDs do not require a back-light and are small-sized, thin, and can be driven with a small amount of power, they are suitable for portable apparatus.

In display devices, a brightness of the picture screen is important. Specifically, in reflection-type LCDs, a reflectivity of the reflector is one important key point. As discussed above, the light transmittance of liquid crystals is not high. Therefore, to ensure satisfactory display quality, reflection-type LCDs must be provided with a high-quality reflector having a high reflectivity.

FIG. 19A and FIG. 19B are schematic views showing the reflection characteristic of reflectors.

Provided on each reflector is a liquid-crystal layer for on/off lighting. The liquid-crystal layer may be any type of TN mode, STN mode or the like having a polarizing plate, or of GH mode, PDLC mode or the like not having a polarizing plate. However, as its transmittance is generally low, the layer is problematic in that it cannot produce high brightness enough for display devices.

In addition, to display color, additive color mixing is generally employed, in which pixels of the three primary colors of light (RGB) are arranged in a plane configuration. In this system, the degree of light utilization is theoretically at most one third of that in monochromatic displaying. Therefore, reflectors with a perfect diffuse reflection characteristic cannot produce bright display images.

Ideally, it is desirable that the reflection characteristic of the reflectors used in reflection-type LCDs be a perfect diffuse reflection type as shown in FIG. 19A. Using a reflector with such a perfect diffuse reflection characteristic may give reflection-type LCDs which produce display images having a constant degree of brightness irrespective of a viewing direction. In this case, however, the incident light will scatter, and therefore the devices including a reflector of this type require strong incident light. Specifically, since the reflection intensity of the perfect diffuse reflection-type reflector is low, another problem contradictory to the problem with the devices as noted above occurs, in that the devices cannot have a satisfactory degree of brightness because of the low transmittance of the liquid crystals.

In most cases, an individual views a liquid-crystal panel almost at a direction perpendicular to the panel (i.e., at its front portion). Since the perfect diffuse reflection-type reflector diffuses light in a broad range, the intensity of the light from the reflector in the direction toward the front of the liquid-crystal panel is lower than a desired level.

To compensate the insufficiency of the light intensity for image displaying, a reflector having a light-scattering characteristic that is an intermediate between the perfect diffuse reflection characteristic and a specular reflection characteristic, as shown in FIG. 19B, may be employed. In general, the reflector with such a light-scattering characteristic can be realized by controlling a degree of roughness of a reflecting surface of the reflector. The reflector as controlled according to this method can increase the intensity of reflected light in some degree within a certain range around the center of the specular reflection direction. Within this range, the brightness of the reflected light from the light-scattering type reflector can be larger than that from the perfect diffuse reflection-type reflector.

However, devices provided with such a light-scattering type reflector are problematic in that the visible angle range is narrow. Therefore, the angle between the viewing direction and the panel must be delicately controlled relative to ambient lighting from ceiling lights and others. For these reasons, these devices are inconvenient for practical use. That is, lighting conditions around display devices vary all the time, for example, in indoor, outdoor, daytime or night time operation. Depending on the lighting conditions, therefore, there will occur still another problem with the devices in that a satisfactory degree of lighting can not be obtained for operation of display devices. The above-noted light-scattering type reflector can produce a higher degree of reflection intensity in specific directions than that to be produced by other perfect diffuse reflection-type reflectors.

However, the former is still defective in that the lighting from it in the area overstepping the specific range is extremely dark and the visible angle range for it is narrowed.

The matter will now be described in more detail.

In FIG. 20, which shows the reflection characteristic of a conventional reflector, an incident ray (a) reflects on a reflecting surface 5 nearly in a front direction. An incident ray (b), as reflecting nearly on the top of a hill of the reflecting surface 5, reflects nearly in a specular direction. An incident ray having an optical path (c) reflects on an inclined area downstream from the top of the hill of the reflecting surface 5, and its reflection angle relative to the surface 5 is larger than its incident angle Oi. In other words, the incident ray (c) reflects on the surface 5 in a direction extremely shifted from the front direction, which is a viewing direction. As a result, the component (c) can not effectively contribute to a displayed image.

In addition, large reflection angles cause another problem as shown in FIG. 21. FIG. 21 shows optical paths of reflected rays in an LCD. Specifically, in FIG. 21, since the incident rays (a) and (b) reflect on the reflecting surface 5 at small reflection angles, almost all the reflected rays transmit out of the panel after passing through a counter substrate 8, a counter electrode 9, and an alignment film 10. However, the incident ray (c) that reflects on the surface 5 at a large reflection angle is problematic in that the reflected ray is totally reflected at an interface of the counter electrode 9 or the counter substrate 8, and therefore does not transmit out of the panel. Therefore, this component (c) does not contribute at all to displaying an image, and is nothing but light loss.

The critical angle for total reflection depends on the refractive indices of the two substances forming the interface. In ordinary liquid-crystal panels, the counter substrate 8 has a refractive index of about 1.55 or so. Therefore, it can be calculated that the angle for total reflection on the interface between the counter substrate 8 and air would be about 40° or so. Accordingly, the component for which the reflection angle is 40° or larger must be minimized as much as possible.

For these reasons, in order to improve the display quality of reflection-type liquid-crystal display devices, it is an important theme to obtain a reflector having a satisfactory degree of reflection intensity capable of compensating for the low transmittance of liquid crystals while ensuring a wide viewing angle range.

As mentioned above, controlling the reflecting orientation of the reflector to enhance the light-scattering ability thereof in conventional reflection-type LCDs often results in an insufficiency of the reflected light intensity in the front direction, which is the viewing direction, whereby the images produced therein are often dark. On the contrary, if the light-scattering ability of the reflector is attenuated, the intensity of reflected rays in specific directions can be increased, but there occurs a problem in that the viewing angle range is narrowed. Therefore, a wide viewing angle range and strong reflection are contradictory to each other in reflection-type LCDs. Accordingly, it has previously been difficult to display quality images.

SUMMARY OF THE INVENTION

Accordingly, one object of the present invention is to solve the above-noted problems.

To achieve this and other objects, the reflector of the present invention includes a planar reflecting surface with hills and valleys in which a first layer having a first refractive index is disposed on the reflecting surface. In addition, light-condensing regions having a second refractive index larger than the first refractive index are disposed on the hills of the reflecting surface.

Further, it is desirable that the light-condensing regions are disposed so that the rays having entered the light-condensing region on the hill to reflect into the region between the hill and an adjacent valley are condensed on the hill. With this configuration, the reflector can reflect all incident rays in its front direction, even rays having a large incident angle.

The light-condensing regions may have a pillar shape, and its side surface may be inclined at an angle between about 60° and 90°. In addition, a surface area below the light-condensing regions may be smaller than a region that includes the most inclined part around each hill.

The LCD of the present invention includes a first substrate on which is disposed a first electrode having a reflecting surface with hills and valleys formed thereon, and a second electrode disposed thereon to be opposed to the first electrode. Also included is a liquid-crystal layer sandwiched between the first electrode and the second electrode, and a means for imparting a voltage to the first or second electrode in accordance with a display signal. Further, a first layer having a first refractive index is disposed between the liquid-crystal layer and the first electrode, and a light-condensing means having a second refractive index that is larger than the first refractive index, is disposed on the hills of the reflecting surface.

Specifically, in the reflector of the present invention, the rays entering nearly in the front direction are reflected back nearly in the front direction, while the rays entering in an oblique direction are also reflected back nearly in the front direction. This is because the reflector includes a planar reflecting surface with a large number of hills and valleys, in which a region having a higher refractive index than any other region is provided on the hills of the reflecting surface. As a result, the reflector realizes both a satisfactorily wide viewing angle range and a satisfactorily high degree of reflected light intensity, relative to its front direction that is substantially a viewing direction.

Further, it is not always necessary for the light-condensing regions to be in direct contact with the hills of the reflecting surface. Rather, the light-condensing regions may be provided above the hill regions of the reflecting surface.

The light-condensing regions may be formed to have a pillar shape. In addition, a side surface of the regions may be inclined at an angle between about 60° and 90°. However, it is not always necessary for the side surface of the light-condensing regions to have a linear profile, but the angle of the side surface may vary within a certain range. For example, the side surface profile may be broadened at its skirt portion near the reflecting surface.

The preferred value for the angle of inclination of the side surface of the light-condensing regions depends on the critical angle for total reflection to occur. The critical angle depends on the interface between the light-condensing region that has a relatively higher refractive index and the adjacent region having a relatively lower refractive index. The critical angle is determined by the ratio of the refractive indices of the two regions.

The cross-section of the pillar region may be circular, oval, or polygonal. Each hill on the reflecting surface may also have any section profile of circular, oval or polygonal ones, etc. It is not always necessary that all pillar regions and hills have the same section profile.

In addition, the high-refractive-index region should be smaller than a region that includes the most inclined part around each hill below it. However, it is not always necessary for all light-condensing regions to satisfy this requirement. The region that includes the most inclined part around each hill on the reflecting surface is meant to indicate the region that has the largest degree of inclination between a hill and the adjacent valley on the reflecting surface. For example, between the upward curved surface of a hill and the downward curved surface of a valley adjacent to the hill on the reflecting surface, there exists a region having a larger degree of inclination than the hill and the valley. In the reflector of the invention, the rays having entered the region with such a larger degree of inclination are condensed in the hills while they pass through the light-condensing region, whereby the proportion of the reflected rays that transmit in the front direction of the reflector is enlarged.

BRIEF DESCRIPTION OF THE DRAWINGS

A more complete appreciation of the present invention and many of the attendant advantages thereof will be readily obtained as the same becomes better understood by reference to the following detailed description when considered in connection with the accompanying drawings, wherein:

FIG. 9 is a view schematically showing still another embodiment of the reflector of the present invention, in which a planarized high-refractive-index layer exists between adjacent light-condensing regions to connect them, while running on the reflecting surface to be planarized in the horizontal direction;

FIGS. 10A–10B are views schematically indicating a relationship between a size of the light-condensing region formed on the reflector of the present invention and a reflection characteristic of the region;

FIGS. 19A–19B are views schematically showing examples of a reflection characteristic of conventional reflectors;

FIG. 20 is a view schematically indicating a principle of a conventional reflector;

DETAILED DESCRIPTION OF PREFERRED EMBODIMENTS

Figure 1A:
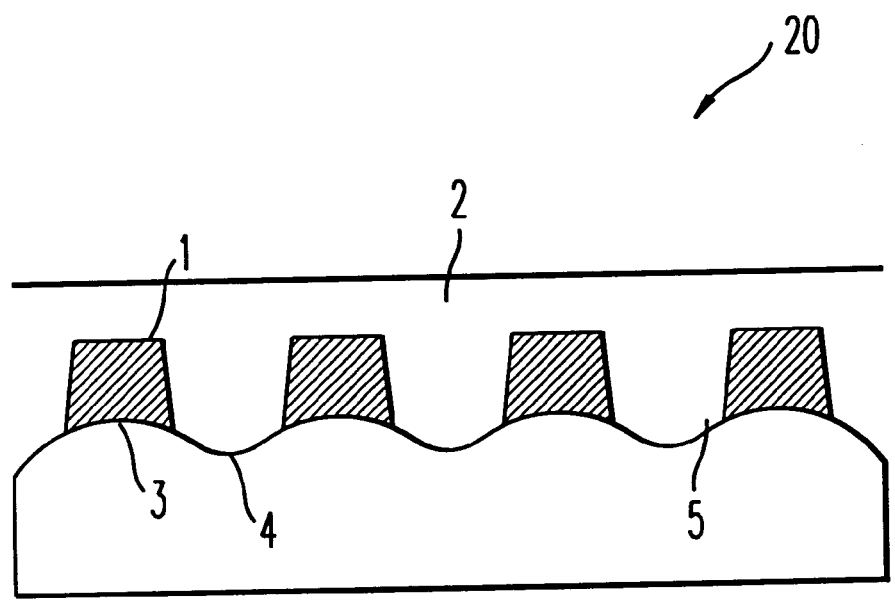
FIGS. 1A–1B are views schematically illustrating a reflector according to the present invention.

Referring now to the drawings, wherein like reference numerals designate identical or corresponding parts through the several views.

Figure 1B:
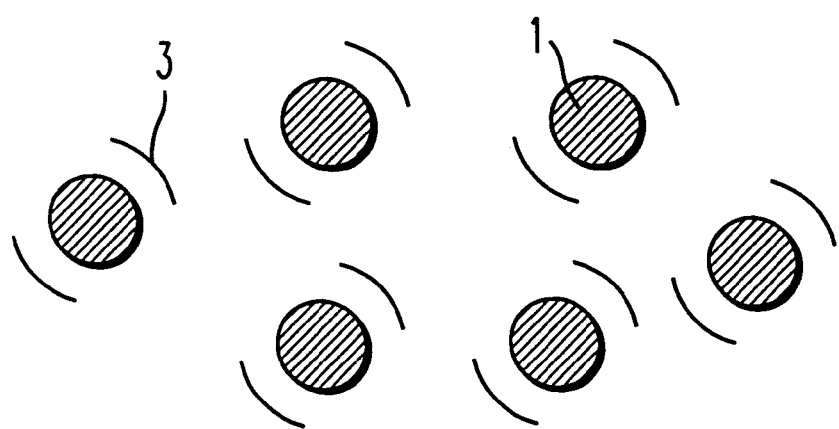

FIG. 1A is a cross-sectional view of the reflector of the present invention and FIG. 1B is a plan view thereof.

A reflector 20 includes hills 3 and valleys 4 formed on a reflecting surface 5. Profiles of the hills 3 and valleys 4 may be formed either randomly or regularly, and their in-plane configuration may be disposed either randomly or regularly, for example, as shown in FIG. 1B. The reflecting surface 5 may include a substrate of resin or the like having the hills 3 and valleys 4 thereon, and a coating layer of a high-reflectance metal of, for example, aluminium, silver, etc., formed over the substrate. Alternatively, the substrate itself may be made of a high-reflectance metal of, for example, aluminium silver or the like.

A light-condensing region 1 is selectively formed on each hill 3 of the reflecting surface 5. The light-condensing region 1 is adjacent to a low-refractive-index region 2. The difference in the refractive index between the two regions 1 and 2 is relatively "1", but not an absolute "1". In general, a high refractive index falls between 1.6 and 1.7 or so, while the low refractive index falls between 1.4 and 1.5 or so. In this case, the ratio of the refractive indices can be readily 0.88 or so. Depending on the materials selected for the regions, the ratio can be nearly equal to "1" with no problem. The ratio of the refractive indices may well fall between 0.82 and 1.00.

Figure 2:
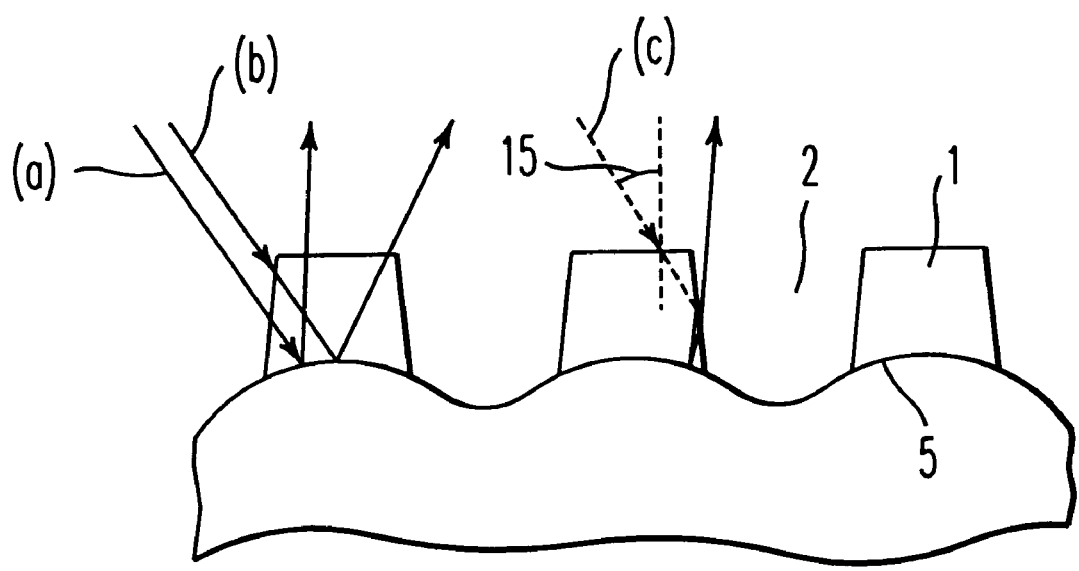
FIG. 2 is a view schematically indicating a principle of the reflector according to the present invention.

The principle of the invention will now be described with reference to FIG. 2. As shown in FIG. 2, three incident rays (a), (b) and (c) enter the reflecting surface 5 at a same incident angle θi (illustrated as reference numeral 15) in an oblique direction relative to the surface 5. In this case, the ratio of the refractive index of the low-refractive-index region 2 to that of the light-condensing region 1 is about 0.9 or so. The ray (a) is refracted by the light-condensing region 1 into a bent optical path while passing through it. That is, the optical path of the refracted ray from (a) is shifted some degree. Therefore, the reflected ray from (a) reflects nearly in a front direction from the reflecting surface 5. The front direction is substantially perpendicular to the surface 5 illustrated in FIG. 2. Similarly to the case of the ray (a), the reflected ray (b) also reflects nearly in the front direction.

As discussed previously with reference to FIG. 20, the ray (c) entering a conventional reflector is reflected on the surface at a broad obtuse angle relative to the incident angle. However, as shown in FIG. 2, the ray (c) entering the reflector of the present invention first passes through the light-condensing region 1 and is totally reflected on a side surface of the region 1. Then, the ray reflects toward the reflecting surface 5. In other words, the ray enters the reflecting surface 5 nearly in a vertical direction. Then, the ray (c) finally reflects nearly in the front direction.

In the conventional reflector, the ray (c) reflects in the direction greatly shifted from the front direction, and is therefore almost useless in image displaying. On the contrary, in the reflector of the present invention, the ray (c) favorably reflects and is useful in image displaying. Therefore, using this reflector in the construction of a reflection-type LCD realizes production of bright and good display images.

FIGS. 3–9 are views showing other embodiments of the reflector of the present invention.

Figure 3:
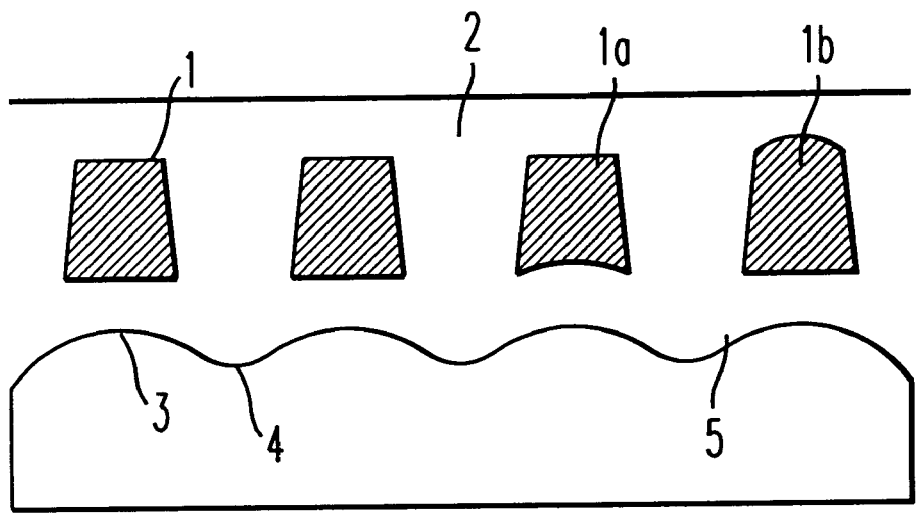
FIG. 3 is a view schematically showing one embodiment of the reflector of the present invention, in which a light-condensing region is embedded in a low-refractive-index region.

According to the reflector of the present invention, it is not always necessary for the hills 3 of the reflecting surface 5 to be in direct contact with the light-condensing region 1. For example, as shown in FIG. 3, there may be a space between the hill 3 and the light-condensing region I. The space may be filled with the same substance as that of the low-refractive-index region 2 or with a different substance.

Figure 4:
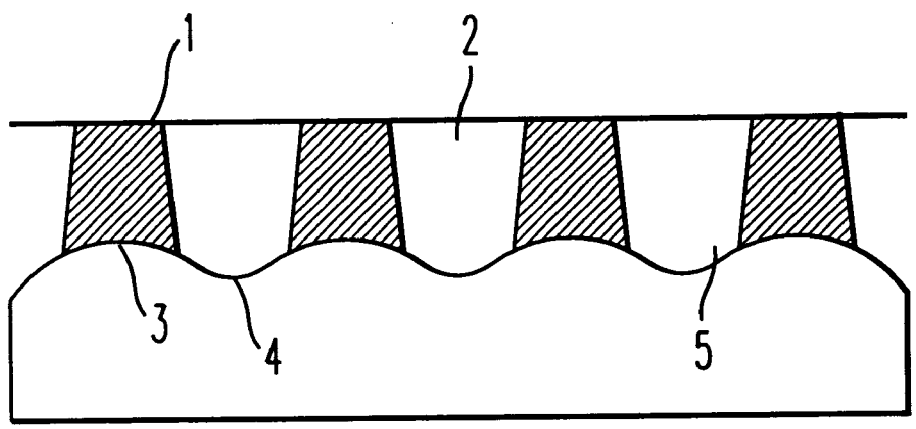
FIG. 4 is a view schematically showing another embodiment of the reflector of the present invention, in which the light-condensing region is formed to have a same height as an adjacent low-refractive-index region.
Figure 5:
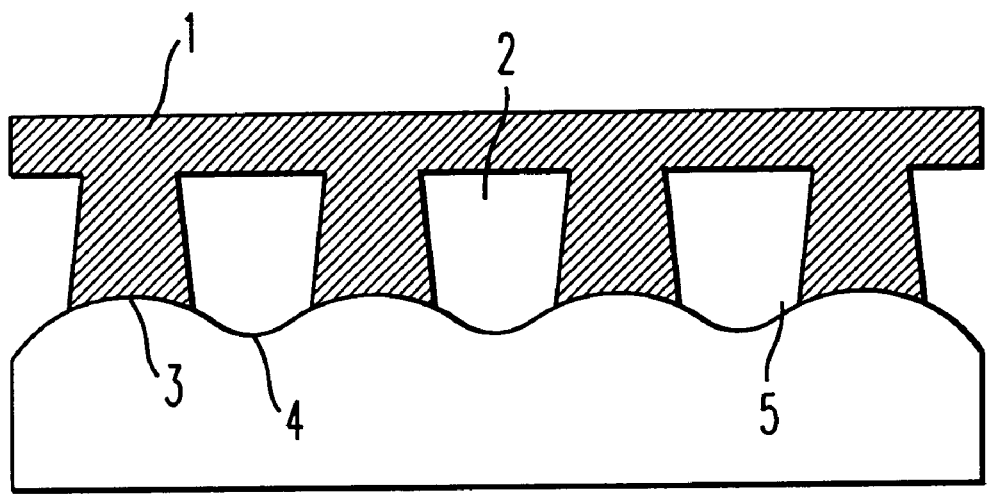
FIG. 5 is a view schematically showing still another embodiment of the reflector of the present invention, in which a high-refractive-index region is formed to surround the adjacent low-refractive-index region.

Further, as shown in FIG. 4, a top surface of the light-condensing region 1 may be left uncovered with the low-refractive-index region 2. Also, as shown in FIG. 5, the low-refractive-index region 2 may be covered with the light-condensing region 1.

Figure 6:
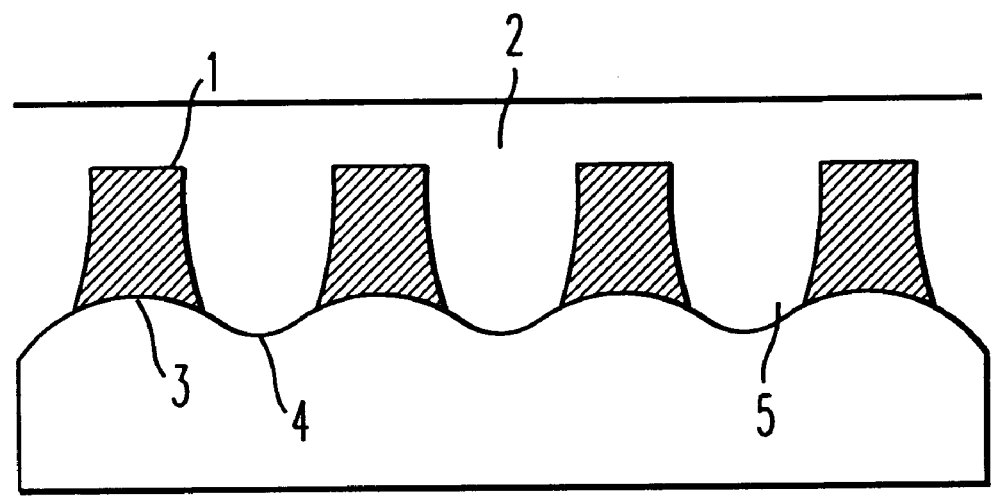
FIG. 6 is a view schematically showing still another embodiment of the reflector of the present invention, in which a side surface of the light-condensing region is curved so that its width is broadened at a skirt portion near the reflecting surface.

In addition, a top surface of the light-condensing region 1 may be curved, like that of a region 1b shown in FIG. 3. The region 1b exhibits a property of condensing the incident light having entered it at its top surface. Therefore, the incident light can be condensed in the vicinity of the top of the hill 3. Further, a bottom surface of the light-condensing region 1 may be curved, like that of a region 1a in FIG. 3. Similarly to these cases, a side surface of the light-condensing region 1 does not always have to be like a side surface of a rotator. That is, the light-condensing region 1 may have any ordinary free curved surface. For example, as shown in FIG. 6, side surfaces of the light-condensing region 1 may be curved, while broadened at a skirt portion thereof near the surface 5.

Figure 7:
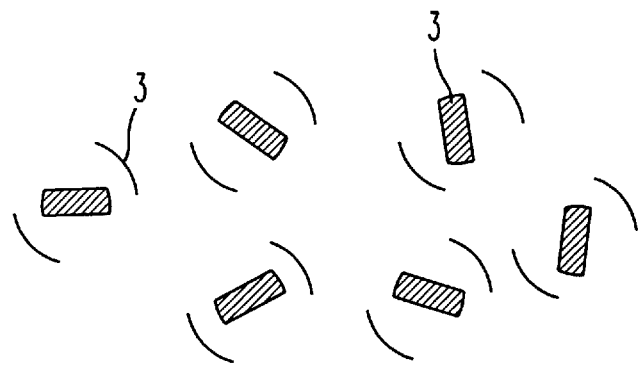
FIG. 7 is a view schematically showing still another embodiment of the reflector of the present invention, in which the light-condensing region is formed to have a rectangular section profile while being oriented at random.

In addition, as shown in FIG. 7, a horizontal cross-section of the light-condensing region 1 does not always need to have a circular truncated cone profile, but may be rectangular or polygonal. Such rectangular regions 1 may be disposed in any desired manner. Where the rectangular regions 1 are oriented at random, the light-condensing directions through the rectangular regions 1 can be averaged. Thus, the rectangular regions 1 can exhibit the same effect as that to be exhibited by the rotator-like light-condensing regions 1.

Figure 8:
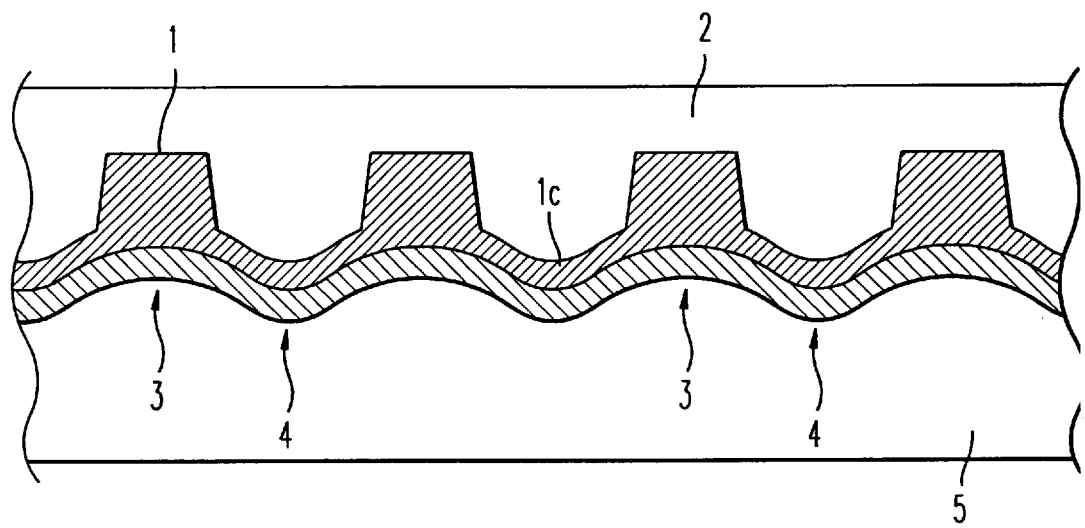
FIG. 8 is a view schematically showing still another embodiment of the reflector of the present invention, in which a curved high-refractive-index layer exists between adjacent light-condensing regions to connect them, while running on the reflecting surface to follow the curved profile of the reflecting surface.

As shown in FIG. 8 and FIG. 9, a high-refractive-index film 1c may exist between the light-condensing regions 1, thereby connecting the regions 1. In FIG. 8, the film Ic exists between the light-condensing regions 1, while running on the underlying surface 5 of the substrate to follow the curved shape of the substrate. In FIG. 9, the high-refractive-index film 1c between the regions 1 is formed to have a planarized surface.

In addition, fine hills and valleys (or micro roughness) may be formed at least partly on the surface of the light-condensing region 1, thereby making the region have some degree of a light-scatterability effect. Alternatively, a small amount of fine particles may also be dispersed inside the region to thereby make the region have some light-scatterability effect. This is effective for smoothing a viewing angle dependence of the light reflected on the reflector.

FIG. 10A and FIG. 10B are views schematically indicating examples of a positional relationship between the hill of the reflecting surface and the light-condensing region to be formed thereon. It is desirable that the light-condensing region 1 is not positioned above a most inclined region 6 of the hill 3, as shown in FIG. 10A. If the light-condensing region 1 is positioned to cover the most inclined region 6, as shown in FIG. 10B, the incident ray having entered the region 1 is first reflected on the reflecting surface 5, and then again reflected on a side surface of the light-condensing region 1. As shown, the finally reflected ray will reflect in the direction shifted from the front direction. This phenomenon will occur when the incident rays reflect on the most inclined region 6. Therefore, to prevent this phenomenon, it is desirable that the light-condensing region 1 is not positioned to cover the most inclined region 6 as shown in FIG. 10A.

However, in the constitution of FIG. 10A, the incident ray entering the most inclined region 6 in the oblique direction must be prevented from directly reflecting on the region 6 (a shown by the dotted line). To achieve this, the light-condensing region 1 must be satisfactorily high enough to shield the most inclined region 6 from direct incident rays, as illustrated in FIG. 10A.

Assuming the inclined angle of the most inclined region 6 is represented by $\theta_s$ (see FIG. 11), the largest reflection angle causing no total reflection is represented by $\theta_0$, a mean hill/valley pitch on the reflecting surface 5 is represented by p, and a height of the light-condensing region 1 is represented by h, the values of h and p can be controlled to satisfy the following formula:

$$p/2h < \tan(\theta_0 2 \times \theta_s).$$

Then, even if incident rays directly enter the most inclined region 6 without being shielded by the light-condensing region 1, they reflect in a total reflection manner.

Figure 11:
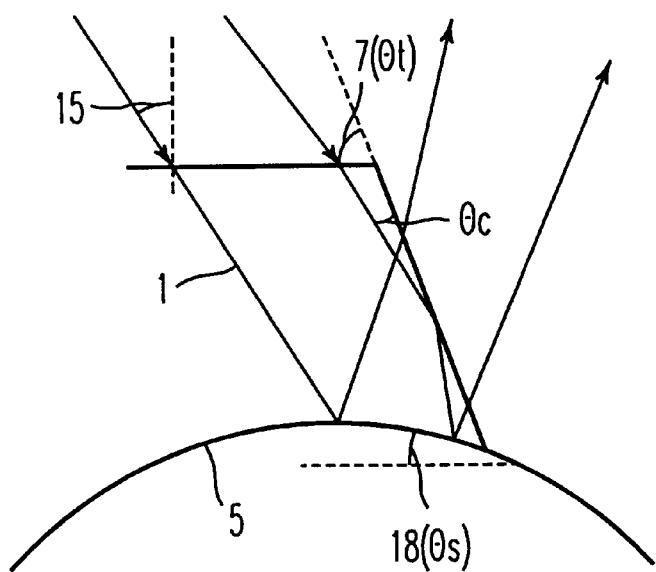
FIG. 11 is a view schematically indicating optical paths of incident rays having entered the reflector of the invention.

FIG. 11 is a view schematically indicating the optical paths of incident rays having entered the reflector of the invention.

As previously mentioned, the critical angle $\theta_c$ for total reflection at the side surface of the light-condensing region 1 is determined based on the ratio of the refractive index of the light-condensing region 1 to that of the low-refractive-index region 2. Therefore, as shown in FIG. 11, the incident rays having entered the reflecting surface at an angle falling between $(90°-\theta_r)$ and $(90°-\theta_r)+(90°-\theta_c)$ are condensed in the front direction through total reflection. $\theta_c$ is represented by the following formula, in which n1 indicates the refractive index of the light-condensing region 1 and n2 indicates the refractive index of the low-refractive-index region 2.

$$\sin \theta_c = (n2/n1)$$

For example, when n1=1.6, n2=1.4 and $\theta_r=10°$, then according to the above formula, the incident rays entering at an incident angle, $\theta_s$=from 10° to 40°, can reflect on the side surface of the light-condensing region 1 in a total reflection manner.

As previously mentioned, the largest incident angle for the rays entering a liquid-crystal panel may be 40 degrees or so. Therefore, it is clear the characteristics of the reflector illustrated herein are satisfactory as those for the reflector to be used in reflection-type LCDs.

If rays having reached the reflecting surface are reflected on the reflecting surface 5, and thereafter again reflected on the side surface of the light-condensing region 1 in a total reflection manner, the light-condensing effect of the region 1 in the front direction will be reduced. Therefore, it is desirable that the reflected rays are not reflected on the side surface of the region 1 in a total reflection manner. For this, the inventors made geometoptical investigations, and have found that to evade the total reflection of the reflected rays on the side surface of the region 1, the reflected rays shall satisfy the following condition:

$$\theta_r + 2\theta_s \sim \theta_c/2$$

For example, when $\theta_c$ is about 30°, $\theta_r$ is about 5° and $\theta_s$ is about 5°, then the reflected rays satisfy the defined condition.

Figure 12:
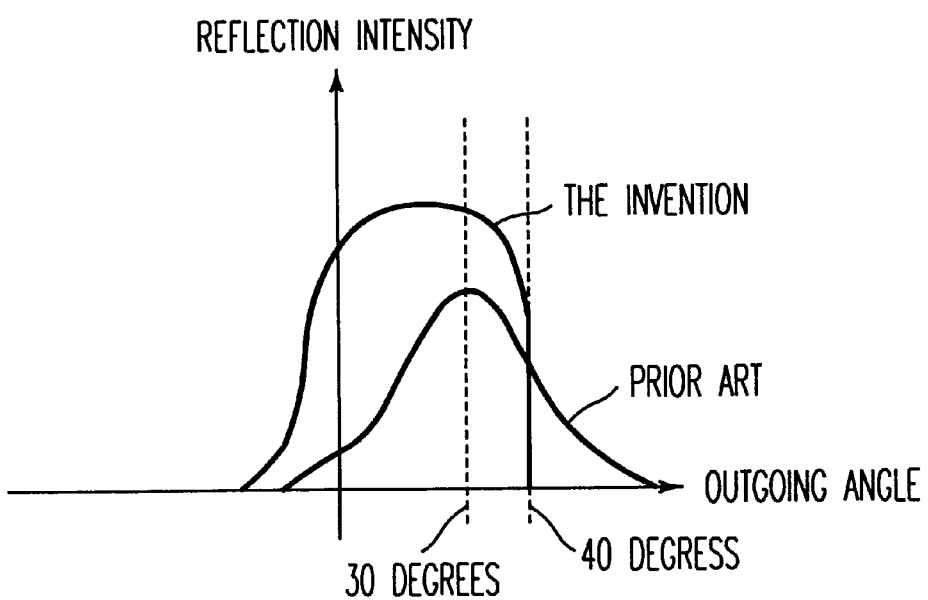
FIG. 12 is a graph showing a reflection characteristic of the reflector and a reflection-type LCD as obtained in the present invention. This Figure indicates a relationship between an angle of reflected rays from incident rays having entered at an incident angle of 30° and an intensity of the reflected rays.

FIG. 12 is a graph showing the reflection characteristic of the reflector obtained in the present invention.

The measurement for this graph was effected at an incident angle of 30°. From data of the conventional reflector, it is known that the peak of the reflection intensity appears in the direction of specular reflection at the reflection angle of 30° relative to the reflector. In a liquid-crystal panel, the liquid-crystal layer is sandwiched between the reflector and the counter substrate. Therefore, the rays reflecting out of the reflector at an angle of 40° or larger relative to the reflector are all reflected on the counter substrate in a total reflection manner, and therefore do reflect out of the panel. On the conventional reflector tested herein, a significantly large proportion of the rays having entered the reflector were reflected in the useless angle region of 40° or larger.

On the reflector of the present invention, the reflection at a reflection angle of 40° or larger is reduced to nearly 0 (zero), because of the total reflection effect on the side surface of the light-condensing region 1, as shown in FIG. 12. Specifically, on the reflector of the invention, the reflected rays at a reflection angle of 40° or larger are led in the front direction (in which the reflection angle is 0°), and are effectively utilized. As a result, the reflection intensity in the front direction of the reflector of the present invention is increased to about 1.5 to 2 times that of the conventional reflector.

Figure 13:
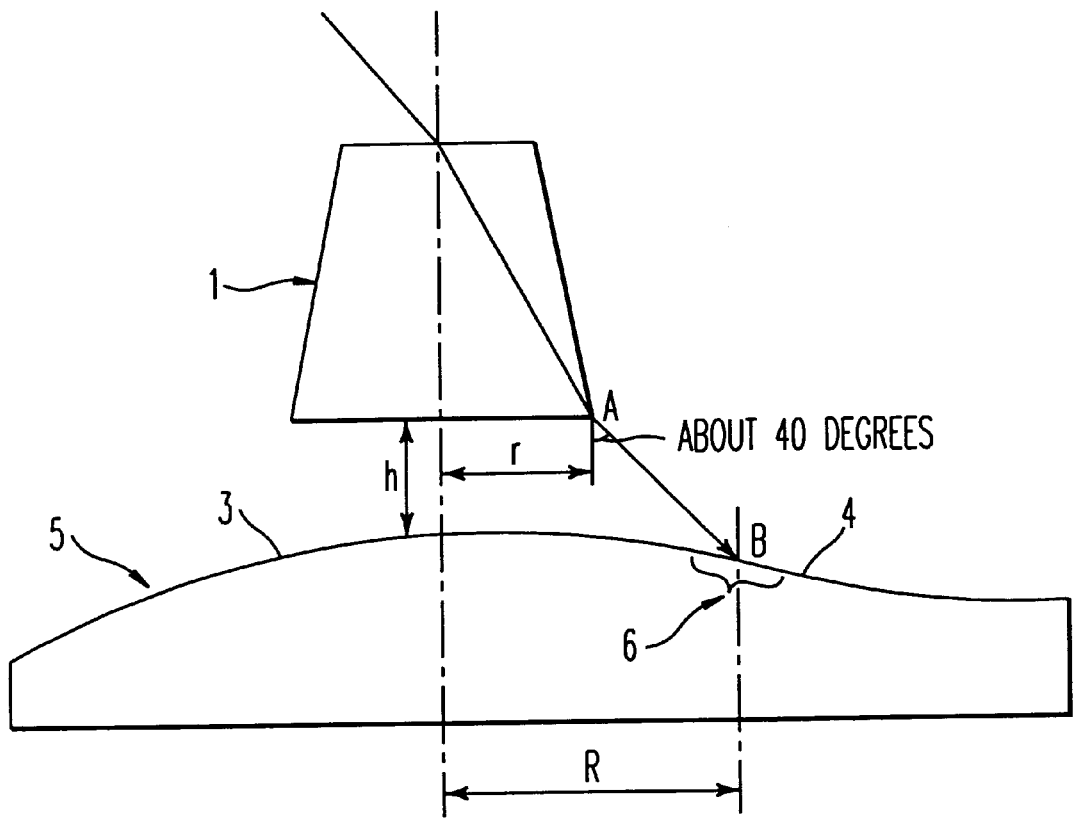
FIG. 13 is a view schematically indicating an optical path of an incident ray having entered the reflector of the present invention.

FIG. 13 is a view schematically indicating an optical path of an incident ray having entered the reflector of the present invention.

As previously mentioned, the largest incident angle at which the incident rays enter each pixel in the liquid-crystal display device of the invention is about 40° or so. Where the incident ray of this type passes through the point A in FIG. 13, and reaches the most inclined region 6 (around the point B) on the reflecting surface 5, the ray cannot receive the light-condensing effect through total reflection. Therefore, the proportion of the reflected rays reflected in the front direction of the reflector decreases.

Accordingly, in the present invention, it is desirable that the distance, h, between the reflecting surface 5 and a bottom surface of the light-condensing region 1 is controlled to be so small that the ray illustrated in the drawing does not reach the most inclined region 6.

In one case, where the hills 3 and the valleys 4 on the reflecting surface 5 are made small to such a degree that they are substantially negligible, the condition in which the reflection in the front direction occurs efficiently can be represented by the following formula:

$$r + h \tan \theta < R$$

where h indicates the distance between the reflecting surface 5 and the bottom surface of the light-condensing region 1; r indicates the radius (a half of the width) of the light-condensing region 1; R indicates the distance between the top of the hill 3 and the most inclined region 6 (at the point B); and $\theta$ indicates the largest incident angle for the incident ray.

In order to further improve the light-condensing capability of the reflector, it is desirable that the ray passing through the point A in FIG. 13 reaches the point of R/2 from the top of the hill 3 of the reflecting surface 5. Therefore, the preferred condition for the above is represented by the following formula:

$$r + h \tan \theta < R/2$$

The value of R varies depending on the shape of the hills and the valleys of the reflecting surface 5. In one case, where the section profile of the hill/valley configuration results in a sine wave, R=P/4 in which P indicates the typical distance between adjacent hills 3. In another case, where spherical surfaces are disposed closely to each other on one plane, R=P/2. The typical distance, P, is meant to indicate the mean distance between the adjacent hills 3. In practice, however, since the hills and the valleys are formed at random, the distance between the adjacent hills varies. For example, when r=4 μm and R=10 μm, then h<1.2 μm or so.

Other embodiments of the present invention will now be described with reference to FIG. 14 and FIG. 15.

Figure 14:
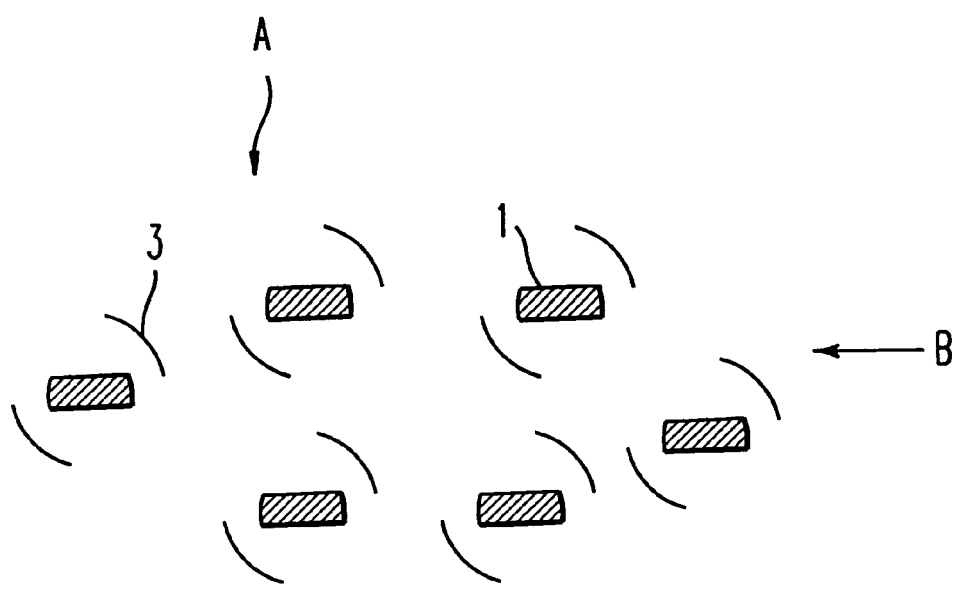
FIG. 14 is a view schematically showing still another embodiment of the reflector of the present invention, in which the light-condensing region is formed to have a rectangular section profile while being oriented in one direction.
Figure 15:
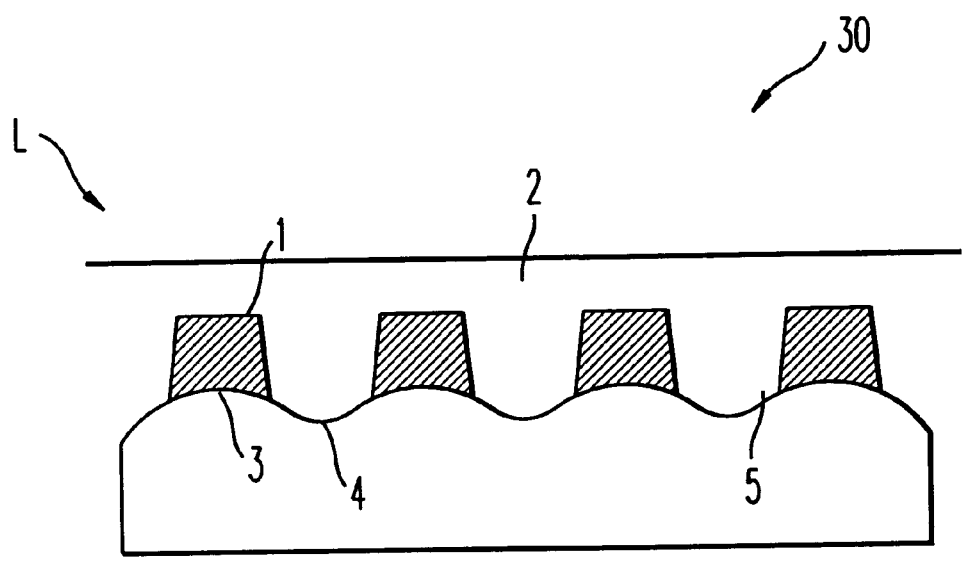
FIG. 15 is a view schematically showing still another embodiment of the reflector of the present invention, in which the light-condensing region is formed while being shifted from a top of each hill of the reflector.

In the embodiments of FIG. 14 and FIG. 15, rectangular light-condensing regions 1 are disposed above the hills 3 of a reflector 30. The embodiment of FIG. 14 differs from that of FIG. 7 in that the light-condensing regions 1 are oriented in one direction in FIG. 14. The embodiment of FIG. 15 differs from that of FIG. 1 in that the light-condensing regions 1 are shifted in a predetermined direction from the top of each hill 3 of the reflector 30 in FIG. 15. Precisely, in FIG. 15, all the light-condensing regions 1 are shifted in a same manner from the top of each hill 3 in a left-hand direction.

In the configuration shown in FIG. 14, most incident rays having entered the reflector in a longitudinal direction, indicated by an arrow "A," are refracted by the light-condensing regions 1, and therefore are reflected in a vertical direction of the reflector. On the other hand, incident rays having entered the reflector in a lateral direction, indicated by an arrow "B," do not almost pass through the light-condensing region 1, and therefore exhibit a same reflection characteristic as that of incident rays entering an original reflector having the hills and the valleys, but not having the light-condensing region on the hills. As a result, in this configuration, the rays in the longitudinal direction "A" are selectively refracted by the regions 1 in the vertical direction of the reflector, while those in the lateral direction "B" give an average distribution of the reflected rays.

In the embodiment of FIG. 15, the light-condensing regions 1 are all shifted from the top of each hill 3 of the reflector 30 in one direction. In this configuration, the incident rays entering the reflector reflect in asymmetric directions. Therefore, the rays entering the reflector in a predetermined direction can be selectively reflected in the direction vertical to the reflector (i.e., in the front direction of the reflector). Where the light-condensing regions 1 are all shifted in the same manner from the top of each hill 3 of the reflector (e.g., shifted in the left-hand direction as shown in FIG. 15), the rays having entered the reflector in the left-hand direction, indicated by an arrow "L," receive the light-condensing effect of the light-condensing regions 1. Therefore, the rays are reflected in the direction vertical to the reflector, or that is, in the front direction of the reflector.

The above-mentioned effect can also be realized when a section profile of the light-condensing regions 1 is made asymmetrical relative to the direction vertical to the reflecting surface. To obtain the same effect, the side surface profile, the inclined angle, as well as the top surface or bottom surface profile of the light-condensing region 1 may also be made asymmetrical.

Further, with reflection-type display devices used in laptop computers, mobile terminals and the like, the displays are generally not perpendicular to a base of the computer (e.g., the displays have an oblique angle). In these instances, the lighting means is generally above an operator's head. Thus, the amount of the incident light entering the picture screen in the longitudinal direction is large. Therefore, if the light entering the picture screen in the longitudinal direction can be more effectively reflected in the direction vertical to the reflecting surface of the screen, the brightness of the screen can be increased.

In such applications, therefore, the reflector of the illustrated embodiment in which the light entering the reflector in the longitudinal direction "A" is selectively reflected in the front direction is extremely advantageous. In one practical application, the reflector of the illustrated embodiment can be utilized in apparatus where the reflection-type display device has an oblique angle relative to the base. In the embodiment of FIG. 15, the light-condensing regions 1 are shifted in the left-hand direction of the drawing. In another modification of this embodiment, the regions 1 may be shifted in the longitudinal direction, for example, as shown in FIG. 14. Also in this modification, the incident rays may be reflected in the front direction of the picture screen.

Figure 22A:
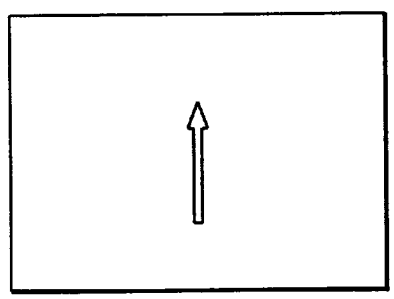
FIGS. 22A–22B are views showing an in-plane distribution of light condensation in a surface of reflectors.
Figure 22B:
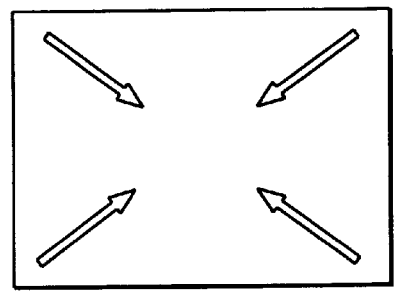

In the above description, all the light-condensing regions 1 are oriented in the same direction, or are all shifted in the same manner from the top of each hill 3. However, the present invention is not limited to these embodiments. In still another modification, the reflector may be partitioned into plural sections, and any of the embodiments of the present invention may be applied to only some of the partitioned sections. In still another modification, the light-condensing characteristic of the reflector can be continuously varied, thereby to make the reflector have a continuous distribution characteristic. Specifically, it is possible to vary a mode of orientation of the light-condensing regions 1 on the reflector so as to concentrate or disperse the rays that run in a specific direction, into or around the range of the center of the picture screen. FIG. 22A and FIG. 22B are views showing an in-plane distribution of the light condensation in the surface of reflectors. In FIG. 22A, the light-condensing characteristic of the reflector is enhanced for rays entering the reflector in the longitudinal direction of the reflecting surface, as in the embodiment illustrated hereinabove. In the embodiment of FIG. 22B, the reflected rays are concentrated in a center of the panel from a peripheral region thereof. The embodiment of FIG. 22B greatly exhibits its effect especially in large-panel LCDs.

Examples of the liquid-crystal display device of the invention are described below.

Figure 16:
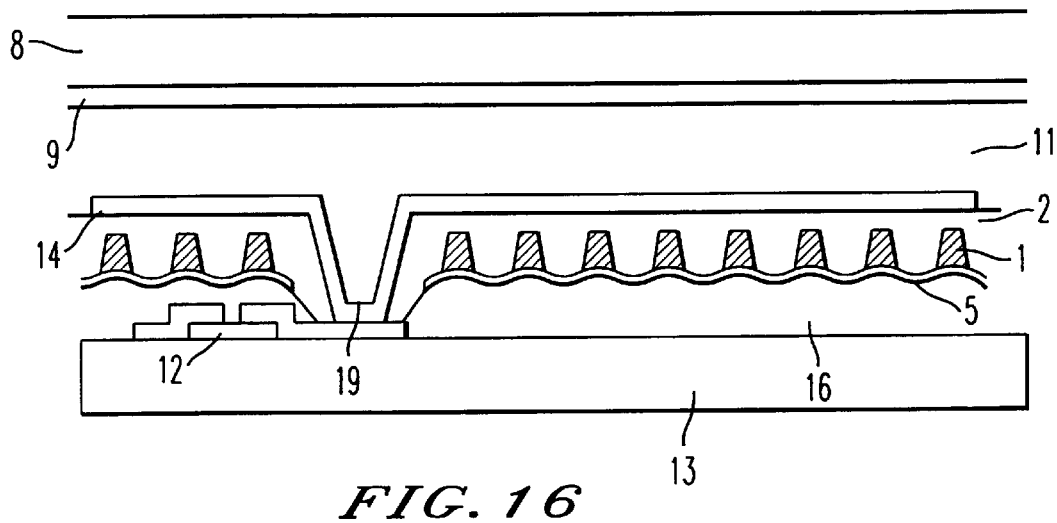
FIG. 16 is a cross-sectional view schematically showing one embodiment of an LCD of the present invention.

FIG. 16 is a cross-sectional view schematically showing one embodiment of the LCD of the present invention.

The device illustrated is provided with a reflector that includes a planar reflecting surface 5 with a large number of hills and valleys formed thereon and a light-condensing region 1 disposed on each hill of the reflecting surface 5. The light-condensing region 1 has a higher refractive index than any other region. The reflector 20 shown in FIG. 1 is one example of such a reflector.

A pixel electrode 14 of a transparent conductive substance, such as ITO or the like, is disposed above the reflector. The pixel electrode 14 is connected with a source electrode of a thin-film transistor 12. In addition, a liquid-crystal layer 11 is sandwiched between the substrate 13, on which the reflector and the pixel electrode 14 are disposed, and a counter substrate 8, on which a counter electrode 9 of ITO or the like is disposed.

In addition, signal interconnections corresponding to each pixel, gate interconnections, and auxiliary capacity interconnections (all not shown), in addition to the thin-film transistor 12, are formed on the substrate 13. In this embodiment, a reversed-stagger-type thin-film transistor 12 is used as a non-linear element, but this is not limitative. That is, any non-linear element other than thin-film transistors, such as an MIM element or the like, may be employed.

The driving liquid crystals may be in the form of microcapsules, for example, as disclosed in Japanese Patent Application Laid Open No. 8-313939. In this case, the counter substrate to support the liquid-crystal layer may be omitted, and the counter electrode may be directly formed on the microcapsule liquid-crystal layer.

Now one example of forming an array substrate and the reflector will be described by referring to FIG. 16.

Formed on the array substrate 13 are the gate interconnections corresponding to each pixel, the signal interconnections, the thin-film transistor 12, the auxiliary capacity interconnections and others. In addition, a photosensitive acrylic resin layer 16 having a thickness of about 2 $\mu$m is formed through spin coating. The thickness of the layer 16 may be suitably varied. Further, a photosensitive acrylic resin sold under the trademark HRC by Nippon Synthetic Rubber, which has a refractive index of about 1.57, may be used as the photosensitive acrylic resin for the layer 16, for example. Then, the substrate 13 thus coated with the photosensitive acrylic resin layer 16 is baked at about 80° C.

Next, this configuration is exposed through a mask and developed to form a random hill pattern, in which each hill has a diameter of about 10 $\mu$m. Thus, a large number of such hills are formed, and at the same time, contact holes 19 are formed. In the hill pattern, the hills do not need to have the same diameter. Next, the substrate 13 is again baked so that the top profile of each hill can be spherical to some degree. Thereafter, the substrate 13 is further baked at about 200° C. to cure the resin layer 16.

Next, aluminium is sputtered over the layer 16 to form an aluminium layer having a thickness of about 300 nm. The aluminium layer forms the reflecting surface 5 of the reflector. To form the reflecting surface 5, the sputtering is not limitative, and the reflecting surface 5 may also be formed through plating or the like. In addition, metal for the reflecting surface 5 is not limited to aluminium, and an aluminium alloy, silver or the like may also be used.

The aluminum reflecting surface 5 in the contact holes 19 is removed through etching. However, it is not always necessary to remove the reflecting surface around the contact holes. The reflecting surface 5 may be partitioned in plural regions for different pixels, or may be formed continuously.

Next, HRC is applied onto the reflecting surface 5 through spin coating to form a layer having a thickness of about 5 μm, and then baked at about 80° C. This configuration is then exposed through a mask and developed to form pillar regions above the hills of the reflecting surface 5. In this step, a mask pattern to be used may be the same as that previously used in forming the hill pattern.

The substrate 13 is then baked at about 200° C. As a result, pillar regions having a taper angle of 80 degrees or so are formed on the hills of the reflecting surface 5. The pillar regions do not need to have a uniform profile.

Next, a film sold under the trademark CYTOP from Asahi Glass, which has a refractive index of about 1.37, as one example, is applied to the substrate to form a layer thereon having a thickness of about 10 μm, and then the configuration is baked at about 200° C. Contact holes 19 are formed through the film formed on the substrate according to a reactive ion etching (RIE) method using $Ar/CF_4/O_2$. The total reflection angle, $\theta_c$, at the interface between the two resin layers is about 30 degrees. Finally, a film of ITO is formed, through sputtering, to be the transparent pixel electrode 14 in each pixel region.

Then, the prepared array substrate is combined with a counter substrate 8 having a counter electrode 9 and the space therebetween is filled with a guest-host type liquid crystal 11.

FIG. 12 applies to the reflection characteristic of the device of the present invention produced in the manner noted above. As previously discussed, the device shown in FIG. 12 has a reflectance of from 1.5 to 2 times that of a conventional reflection-type liquid-crystal display device.

In addition, the method for producing the light-condensing regions 1 is not limited to the embodiment illustrated above. That is, another method, which will now be discussed, may be used.

A transparent resin sold under the trademark CYCLOTENE 3022 by Dow Chemical may be applied onto the reflecting surface 5 through spin coating to form a layer having a thickness of about 5 μm, and then is baked at about 210° C. Next, a film of Cu is formed over the baked CYCLOTENE layer, and a photoresist pattern is formed over the Cu layer. Then, the Cu layer is patterned through etching or the like, via the photoresist pattern acting as a mask, and thereafter the photoresist is removed.

Then, the CYCLOTENE layer is patterned through RIE with $CF_4/O_2$, via the patterned Cu layer acting as a mask. In this step, the CYCLOTENE layer only in the region below the Cu mask selectively remains as it is, without being etched away, and is patterned to give pillar-shaped light-condensing regions 1. By controlling the pressure for RIE in this step, the taper angle at the side surface of each pillar-shaped light-condensing region 1 can be controlled. In this example, the taper angle is controlled to be about 80°.

Then, the Cu layer having acted as the mask is removed through etching. Next, CYTOP is applied over the light-condensing regions 1 to form a film having a thickness of about 3 μm, and then is baked at about 200° C.

If desired, an interlayer of Ti or the like may be provided between the CYCLOTENE layer and the Cu mask to improve the adhesiveness therebetween. The material of the mask for the CYCLOTENE patterning is not limited to Cu, and any other materials may be suitably employed.

For example, where adjacent pillar-shaped light-condensing regions are separated from each other, as in the embodiment of FIG. 1, selectivity etching is needed between the metal that constitutes the reflecting surface 5 and the metal of the etching mask in the step of removing the etching mask. On the other hand, however, where the reflecting surface 5 is previously coated, as in the embodiment of FIG. 8, there occurs no problem with selectivity etching between the metal of the reflecting surface 5 and the metal of the etching mask. Therefore, in this case, the etching mask and the reflecting surface 5 may be made of the same metal of, for example, aluminium or the like.

In addition, the material for the light-condensing regions is not limited only to CYCLOTENE, and any other materials capable of giving a predetermined refractive index may also be used. Though not limitative, the light-condensing regions are preferably made of a transparent material. If desired, however, the regions may be colored.

Further, the material for the etching mask is not limited to metal. For example, a photoresist may be used. In this case, the step of forming the metal mask is omitted, and the process can be simplified. However, since the resist is etched in the RIE step, the thickness of the resist mask must be at least the same as or larger than that of the light-condensing regions.

Another embodiment of producing an LCD including the reflector of the present invention will now be described.

Figure 17:
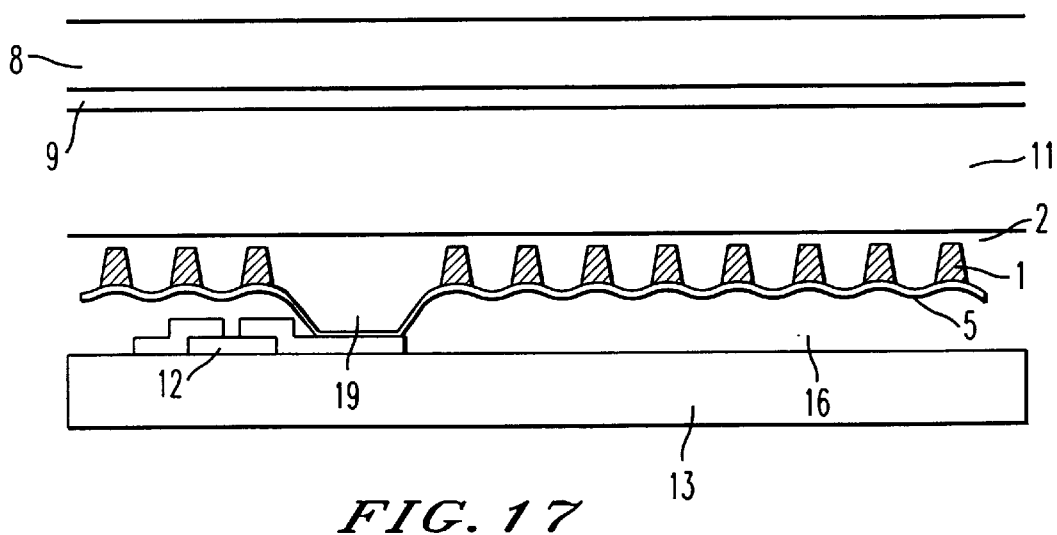
FIG. 17 is a cross-sectional view schematically showing another embodiment of the LCD of the present invention.

FIG. 17 is a cross-sectional view schematically showing another embodiment of the LCD of the present invention. To produce the device illustrated, the process for forming the resin on the array substrate and forming a film of a high-reflectance metal, such as aluminium or the like, over the resin layer is the same as in the embodiment previously mentioned. After that process, the metal film is separately patterned for each pixel. In this embodiment, the mean pitch of hill/valley of the reflecting surface 5 is about 3 μm.

Next, HRC is applied onto the reflecting surface 5 through spin coating to form a layer having a thickness of about 3 μm, and then is baked at about 80° C. This configuration is then exposed through a mask and developed to form pillar regions above the hills of the reflecting surface 5. In this step, the mask pattern to be used may be the same as that previously used in forming the hill pattern. The substrate 13 is then baked at about 200° C. As a result, pillar regions having a taper angle of about 80 degrees are formed on the hills of the reflecting surface 5. The pillar regions do not need to have a uniform profile.

Next, CYTOP is applied to the substrate 13 to form a layer having a thickness of about 3 μm, and then is baked at about 200° C. As a result, the total thickness of a light-condensing region 1 and the low-refractive-index region 2 both formed on the reflecting surface 5 reaches about 3 μm. The method for forming the light-condensing regions 1 is not limited to that illustrated herein. For example, the regions 1 may also be formed in the same manner as in FIG. 16.

The prepared array substrate is combined with a counter substrate 8 having a counter electrode 9, and the space therebetween is filled with a guest-host type liquid crystal 11. In this embodiment, the reflecting surface 5 additionally acts as the electrode for the array substrate. The distance between the liquid-crystal layer 11 and the reflecting surface 5 is about 3 μm, while the thickness of the liquid-crystal layer 11 is not smaller than about 10 μm. In this configuration, the influence of a potential drop is substantially negligible. FIG. 12 applies to the reflection characteristic of the device of this embodiment. Further, as previously discussed, the device of FIG. 12 has a reflectance of from 1.5 to 2 times that of a conventional reflection-type liquid-crystal display device.

Still another embodiment of producing an LCD including the reflector of the invention will now be described by referring to FIG. 18.

Figure 18:
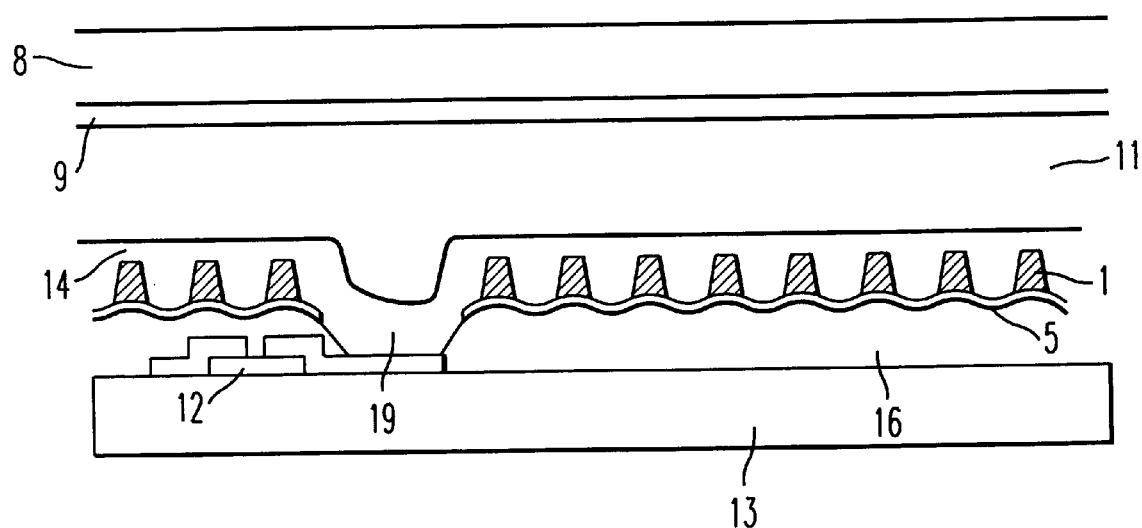
FIG. 18 is a cross-sectional view schematically showing still another embodiment of the LCD of the present invention. In this embodiment, since a transparent conductive film additionally acts as a pixel electrode, the pixel electrode as in FIG. 16 is omitted.
Figure 21:
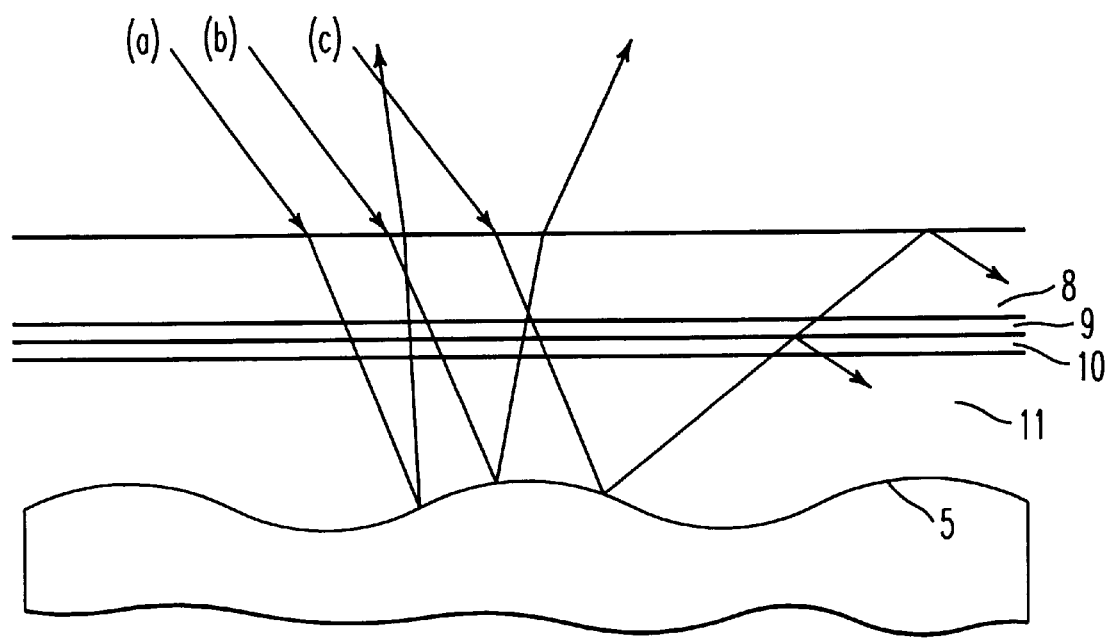
FIG. 21 is a view schematically indicating a relationship between the reflection characteristic of the reflector in a reflection-type LCD and a display characteristic of the device.

The embodiment of FIG. 18 differs from that of FIG. 16 in that the pixel electrode 14 of ITO is formed on the CYTOP layer 2 in FIG. 16, while a transparent conductive film 141 is formed in place of the CYTOP layer in FIG. 18. In the embodiment of FIG. 18, the transparent conductive film 141 additionally acts as the pixel electrode 14. Therefore, the step of forming the pixel electrode as in the embodiment of FIG. 16 is omitted.

In this embodiment, the process up to forming the light-condensing regions 1 on the reflecting surface 5 is the same as in the other embodiments mentioned above, and its description is omitted.

After the light-condensing regions 1 have been formed on the reflecting surface 5, a transparent conductive film having fine particles dispersed therein is formed thereover. In general, the transparent conductive film having fine particles dispersed therein is of a transparent resin in which are dispersed fine conductive particles to make the resin film have electric conductivity. The resin for the transparent conductive film may be, for example, any acrylic resins, polyester resins and nylon resins. The fine conductive grains to be in the resin may be, for example, fine grains of $SnO_2$, $Sb-SnO_2$, $Sn-In_2O_3$ (ITO) or $Zn-In_2O_3$, or even those of Al or Zn-doped ITO. The refractive index of the resin film with those conductive fine particles can be nearly the same as that of ordinary resin films.

The transparent conductive film thus formed is then patterned into a pattern of the transparent conductive film 141 as electrically isolated for each pixel. If desired, a photosensitive resin may be used for forming the film, which may be subjected to photo-patterning. The transparent conductive film 141 additionally acts as the pixel electrode.

In general, the fine particles to be dispersed in the resin film may well have a particle size of tens nm, and the resin film containing such fine particles is well transparent in the visible ray region. However, the fine particles to be used may have a larger particles size of from hundreds nm to a few microns. The transparent conductive film 141 containing such large grains can have an effect of light scatterability. Such large grains will be effective for smoothing the viewing angle dependence of the reflected light on the reflector. After this step, a liquid-crystal layer is laminated over the film 141 to complete the intended liquid-crystal device.

As mentioned in detail above, the advantage of the reflector of the present invention is that the rays having entered it nearly in the front direction are reflected nearly in the front direction and those having entered it in the oblique direction are reflected thereon also nearly in the front direction. Therefore, the reflector of the present invention realizes both a satisfactorily broad visible angle range and a satisfactory high degree of reflected light intensity, relative to its front direction that is a substantially viewing direction.

In addition, providing the reflector having such excellent reflection characteristics, which utilizes ambient light, the invention further realizes bright and high-contrast images and a wide viewing angle range. In particular, the LCD of the present invention is especially suitable to portable information apparatus. Using the device in these apparatus is favorable as the power to be consumed is reduced and high-quality image displaying is possible.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of United States is:

1. A reflector comprising:
    a plane reflecting surface having continuous hills and valleys;
    a corresponding one of pillar-shaped light-condensing regions respectively disposed above each of said hills, said light-condensing regions having a first refractive index; and
    a layer disposed above said reflecting surface and on said light-condensing regions, and having a second refractive index smaller than said first refractive index.

2. A reflector according to claim 1, wherein said layer is disposed directly on the valleys.

3. A reflector according to claim 2, further comprising:
    a light-condensing film disposed on said valleys having said first refractive index.

4. A reflector according to claim 1, wherein said light-condensing regions are disposed directly on said hills.

5. A reflector according to claim 3, wherein said light-condensing film is disposed along said valleys.

6. A reflector according to claim 3, wherein said light-condensing film has a substantially plane surface on said valleys.

7. A reflector according to claim 4, wherein at least one light-condensing region of said light-condensing regions is disposed on a top of said hill.

8. A reflector according to claim 4, wherein at least one light-condensing region of said light-condensing regions is shifted from a top of said hill.

9. A reflector according to claim 8, wherein said light-condensing regions are uniformly shifted on said plane reflecting surface.

10. A reflector according to claim 8, wherein said light-condensing regions are shifted to concentrate reflected light to a center of said plane reflecting surface.

11. A reflector according to claim 1, wherein said light-condensing regions are disposed within said layer.

12. A reflector according to claim 1, wherein a side surface of said at least one light-condensing region inclines between 60 degrees and 90 degrees against the plane surface.

13. A reflector according to claim 1, wherein said at least one light-condensing region comprises a polygonal cross-section.

14. A reflector according to claim 13, wherein normal directions of side surfaces of said light-condensing regions are randomly disposed.

15. A reflector according to claim 13, wherein normal directions of side surfaces of said light-condensing regions are the same.

16. A reflector according to claim 1, wherein a side surface of said at least one light-condensing region is curved and broadened at a skirt portion.

17. A reflector according to claim 1, wherein at least one of a top surface and a bottom surface of at least one light-condensing region of the light-condensing regions comprises a curved shape.

18. A reflector according to claim 1, wherein said hills and valleys are randomly disposed.

19. A reflector according to claim 1, wherein a top surface of said light-condensing regions and said layer have substantially a same level.

20. A reflector according to claim 1, wherein a ratio of said second refractive index to said first refractive index is between 0.82 and 1.00.

21. A reflector comprising:
- a plane reflecting surface having continuous hills and valleys;
- portions disposed on said valleys, and having a first refractive index; and
- a corresponding one of light-condensing regions respectively disposed on each of said hills, said light-condensing regions covering said portions and having a second refractive index larger than said first refractive index.

22. A reflective type liquid crystal display comprising:
- a substrate;
- a plane reflecting surface having continuous hills and valleys on said substrate;
- a corresponding one of pillar-shaped light-condensing regions respectively disposed on each of said hills, said light-condensing regions having a first refractive index;
- a layer on said plane reflecting surface, and having a second refractive index smaller than said first refractive index;
- a first electrode on said layer, and electrically insulated for a pixel;
- a liquid crystal layer on said first electrode;
- a second electrode on said liquid crystal layer; and
- means for supplying image signals to said first electrode.

23. A reflective type liquid crystal display comprising:
- a substrate;
- a plane reflecting surface having continuous hills and valleys on said substrate, and electrically insulated for a pixel;
- a corresponding one of pillar-shaped light-condensing regions respectively disposed on each of said hills, said light-condensing regions having a first refractive index;
- a layer on said plane reflecting surface, having a second refractive index smaller than said first refractive index;
- a liquid crystal layer on said layer;
- an electrode on said liquid crystal layer; and
- means for supplying image signals to said plane reflecting surface.

24. A reflective type liquid crystal display comprising:
- a substrate;
- a plane reflecting surface having continuous hills and valleys on said substrate;
- a corresponding one of pillar-shaped light-condensing regions respectively disposed on each of said hills, said light-condensing regions having a first refractive index;
- a layer on said plane reflecting surface, having a second refractive index smaller than said first refractive index, and electrically insulated for a pixel;
- a liquid crystal layer on said layer;
- an electrode on said liquid crystal layer; and
- means for supplying image signals to said layer.

* * * * *